United States Patent
Guan (10) Patent No.: US 11,245,121 B2
(45) Date of Patent: Feb. 8, 2022

(54) HUMIDIFIER

(71) Applicant: AISIN SEIKI KABUSHIKI KAISHA, Kariya (JP)

(72) Inventor: Yu Guan, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 96 days.

(21) Appl. No.: 16/865,923

(22) Filed: May 4, 2020

(65) Prior Publication Data

US 2021/0036346 A1 Feb. 4, 2021

(30) Foreign Application Priority Data

Aug. 1, 2019 (JP) .............................. JP2019-142300

(51) Int. Cl.
*H01M 8/04119* (2016.01)
*F24F 6/04* (2006.01)

(52) U.S. Cl.
CPC ........... *H01M 8/04126* (2013.01); *F24F 6/04* (2013.01)

(58) Field of Classification Search
CPC ... H01M 8/04126; H01M 8/04149; F24F 6/04
USPC ........................................ 261/101, 102, 104
See application file for complete search history.

(56) References Cited

U.S. PATENT DOCUMENTS

| | | | | |
|---|---|---|---|---|
| 7,875,396 | B2* | 1/2011 | Zhang | B01D 63/082 429/413 |
| 2005/0275120 | A1* | 12/2005 | Sasamoto | H01M 8/02 261/104 |
| 2012/0181712 | A1 | 7/2012 | Vanderwees et al. | |
| 2012/0193820 | A1* | 8/2012 | Montie | B01D 46/521 261/160 |
| 2014/0319706 | A1 | 10/2014 | Huizing et al. | |
| 2014/0326432 | A1 | 11/2014 | Dean et al. | |
| 2015/0059578 | A1 | 3/2015 | Huizing et al. | |
| 2015/0180059 | A1 | 6/2015 | Vanderwees et al. | |
| 2015/0325869 | A1* | 11/2015 | Fasold | F24F 6/00 429/413 |
| 2016/0290664 | A1 | 10/2016 | Dean et al. | |
| 2017/0346110 | A1 | 11/2017 | Vanderwees | |
| 2019/0288306 | A1* | 9/2019 | Becker | H01M 8/04149 |

FOREIGN PATENT DOCUMENTS

| | | | |
|---|---|---|---|
| DE | 102015005099 A1 | * | 3/2016 |
| JP | 2010-276322 A | | 12/2010 |
| JP | 2014-505336 A | | 2/2014 |
| JP | 2015-509178 A | | 3/2015 |

* cited by examiner

*Primary Examiner* — Charles S Bushey
(74) *Attorney, Agent, or Firm* — Oblon, McClelland, Maler & Neustadt, L.L.P.

(57) ABSTRACT

A humidifier includes plural separators each formed in a plate shape, the separator including a flow path on each of a front side and a back side thereof, and a water exchanging film sandwiched between the separators at a boundary thereof which are adjacent to each other in a state where the plural separators are stacked on each other. Humidified gas flows in one of the flow paths facing each other with the water exchanging film therebetween, and dry gas flows in the other of the flow paths. The water exchanging film is formed in an elongated shape, and different areas of the water exchanging film are sandwiched by the separators at plural boundaries thereof.

5 Claims, 8 Drawing Sheets

HUMIDIFIER

CROSS REFERENCE TO RELATED APPLICATIONS

This application is based on and claims priority under 35 U.S.C. § 119 to Japanese Patent Application 2019-142300, filed on Aug. 1, 2019, the entire content of which is incorporated herein by reference.

TECHNICAL FIELD

This disclosure generally relates to a humidifier.

BACKGROUND DISCUSSION

A known humidifier humidified gas supplied to a fuel cell is disclosed in JP2010-276322A (hereinafter referred to as Patent reference 1). According to Patent reference 1, the humidifier includes groove walls of a humidification chamber at one of surfaces of a separator, and groove walls of a moisture absorption-chamber at the other of surfaces of the separator. The separator includes plural separators stacked on each other, the plural separators adjacent to each other having a water-retaining film therebetween. According to Patent reference 1, humidified gas is supplied to the humidification chamber, and moisture-absorption gas is supplied to the moisture-absorption chamber, so as to humidify the moisture-absorption gas by the penetration of water included in the humidified gas to the water-retaining film.

The separator in Patent reference 1 is formed in a quadrilateral shape, and includes a humidified-gas inlet port and a humidified-gas outlet port at each of a pair of corner portions of the separator in a diagonal direction, the ports which are communicated with the humidification chamber. A moisture-absorption gas inlet port and a moisture-absorption gas outlet port are provided at each of a pair of corner portions of the separator in the other diagonal direction and the ports are communicated with the moisture-absorption chamber.

The humidifier in Patent reference 1 includes the plural separators which are stacked on each other, and the water-retaining film sandwiched by the separators is formed in a hexagonal shape in which parts supporting the four corners of the separator are removed to flow gas through the four-corner ports.

Japanese Unexamined Patent Application Publication No. 2014-505336A (hereinafter referred to as Patent reference 2), similarly to Patent reference 1, includes a dry plate provided with plural linear grooves at opposing sides thereof and a humidifying plate provided with plural linear grooves at opposing sides thereof. The dry plate and the humidifying plate are stacked on each other such that the grooves included in the plates are orthogonally arranged, and a water-permeable film is provided between the dry plate and the humidifying plate. Dry-air flow flows in the grooves of the dry plate, and humidifying-air flow flows in the grooves of the humidifying plate to move moisture vapor from the humidifying-air flow to the dry air flow to humidify the dry-air flow.

According to the humidifier in Patent reference 2, the dry plate and the humidifying plate are stacked on each other such that the direction in which the dry-air flow flows in the grooves of the dry plate and the direction in which the humidifying-air flow flows in the grooves of the humidifying plate are orthogonal to each other. Further, since the dry plate and the humidifying plate are formed in a square shape, and the areas where the grooves are formed in the plates are formed in a square shape, a water permeable film is formed in a square shape.

Since the humidifiers in Patent references 1 and 2 each is adapted with a configuration in which the film is provided at a boundary between the grooves in which humidified-gas flows and the grooves in which the dry-gas flows, and when assembling the humidifier, the water-permeable film is sandwiched between the plates in stacking process of the plates (the separator in Patent reference 1).

However, each of the humidifiers in Patent references 1 and 2 not only requires a process cutting the film to an appropriate size, but also positioning the cut film in high precision at the appropriate position between the plates when the plates are stacked on each other after the cutting process of the film. In particular, since the film is extremely thin, the operation is not easy, and some parts, depending on the positions, may require seals preventing the gas from leaking out.

A need thus exists for a humidifier which is not susceptible to the drawback mentioned above.

SUMMARY

According to an aspect of this disclosure, a humidifier includes plural separators each formed in a plate shape, the separator including a flow path on each of a front side and a back side thereof, and a water exchanging film sandwiched between the separators at a boundary thereof which are adjacent to each other in a state where the plural separators are stacked on each other. In a stacked state where each of the plural separators and the water exchanging film are alternately stacked on each other, humidified gas flows in one of the flow paths facing each other with the water exchanging film therebetween, and dry gas flows in the other of the flow paths. The water exchanging film is formed in an elongated shape, and different areas of the water exchanging film are sandwiched by the separators at plural boundaries thereof, respectively, the boundaries continuously provided in a stacking direction of the separators in the stacked state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of the disclosure will hereunder be explained with reference to the drawings.

Figure 1:
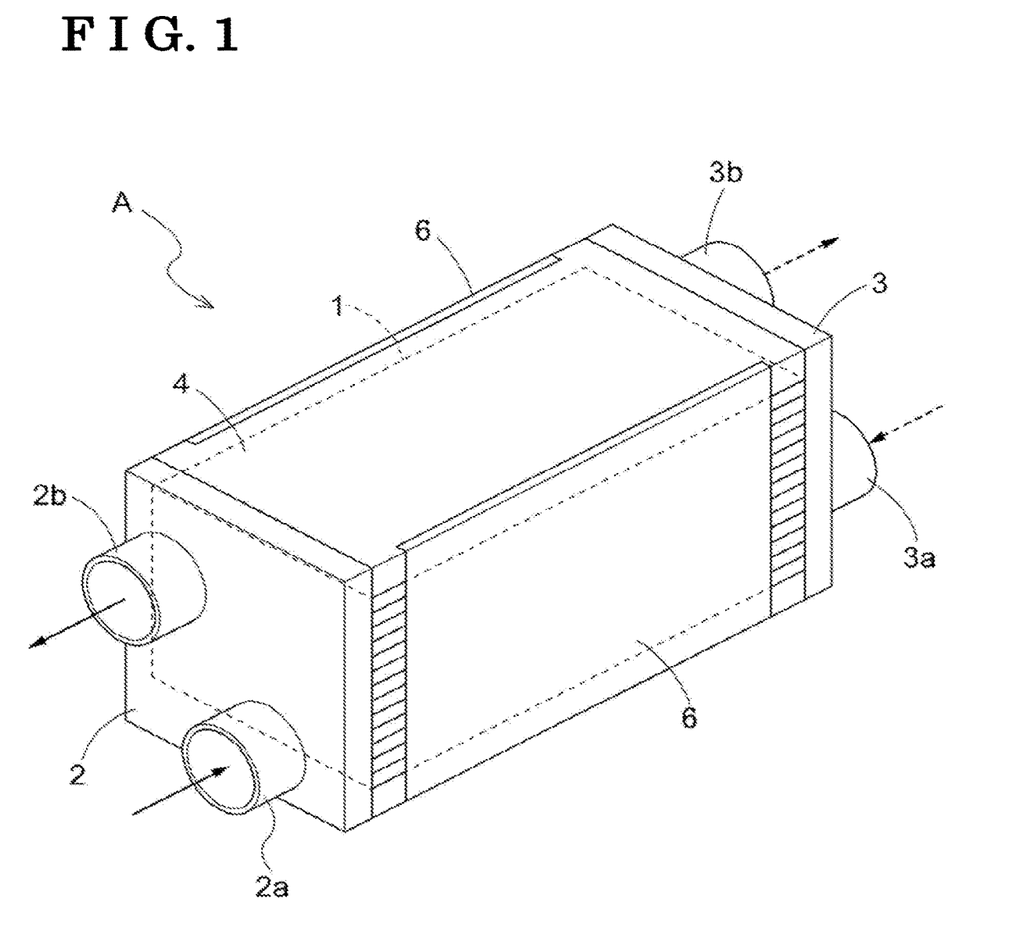
FIG. 1 is a perspective view of a humidifier according to a first embodiment.
Figure 2:
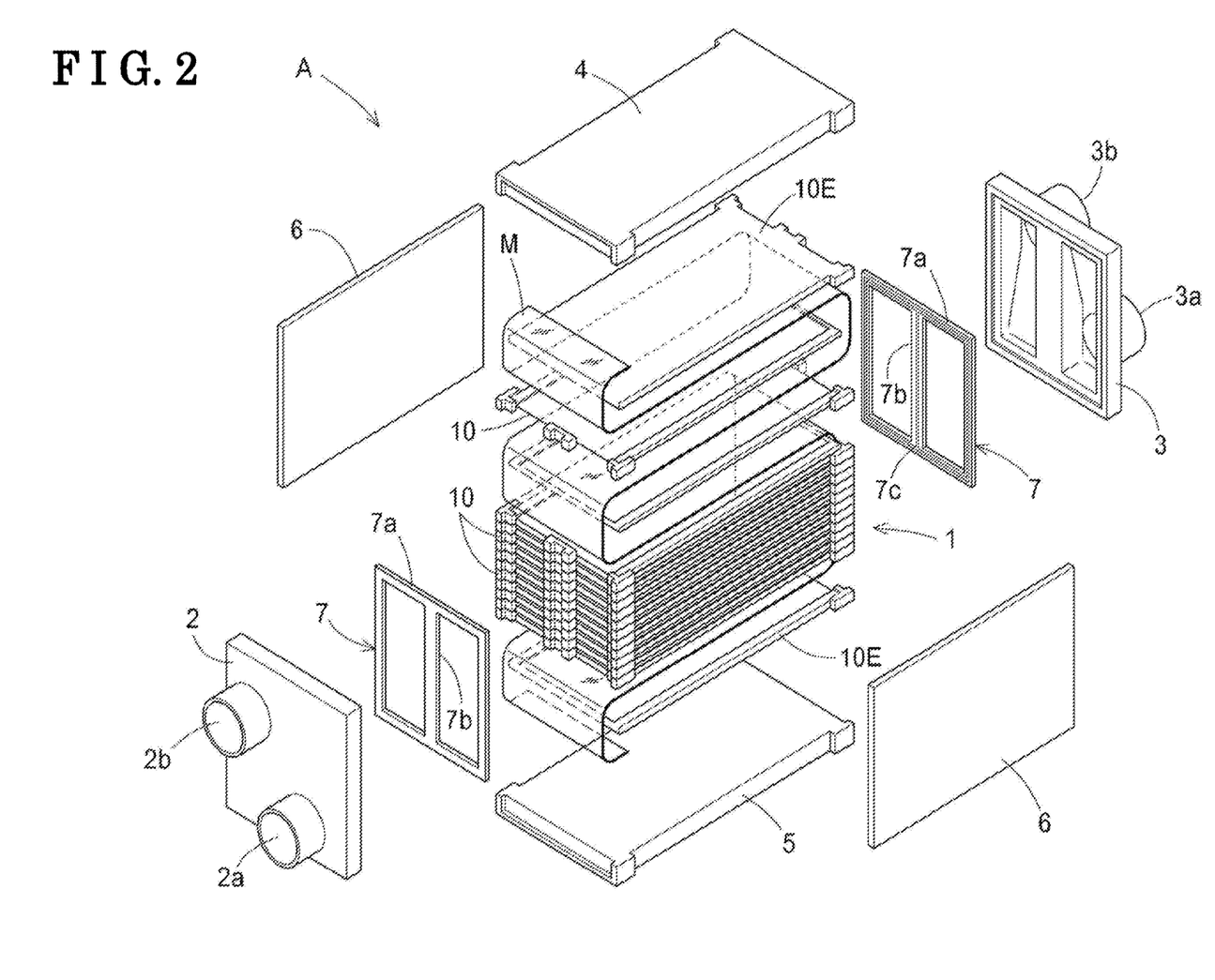
FIG. 2 is an exploded perspective view of the humidifier.

The basic configuration will hereunder be explained. As shown in FIGS. 1 and 2, a humidifier A includes a humidifier unit 1, a humidifying-side manifold 2, and a moisture-absorption-side manifold 3. The humidifier unit 1 supplies moisture included in cathode-off gas (an example of humidified gas) to cathode gas (an example of dry gas). The humidifying-side manifold 2 supplies and discharges the cathode-off gas. The moisture-absorption-side manifold 3 supplies and discharges the cathode gas.

Figure 3:
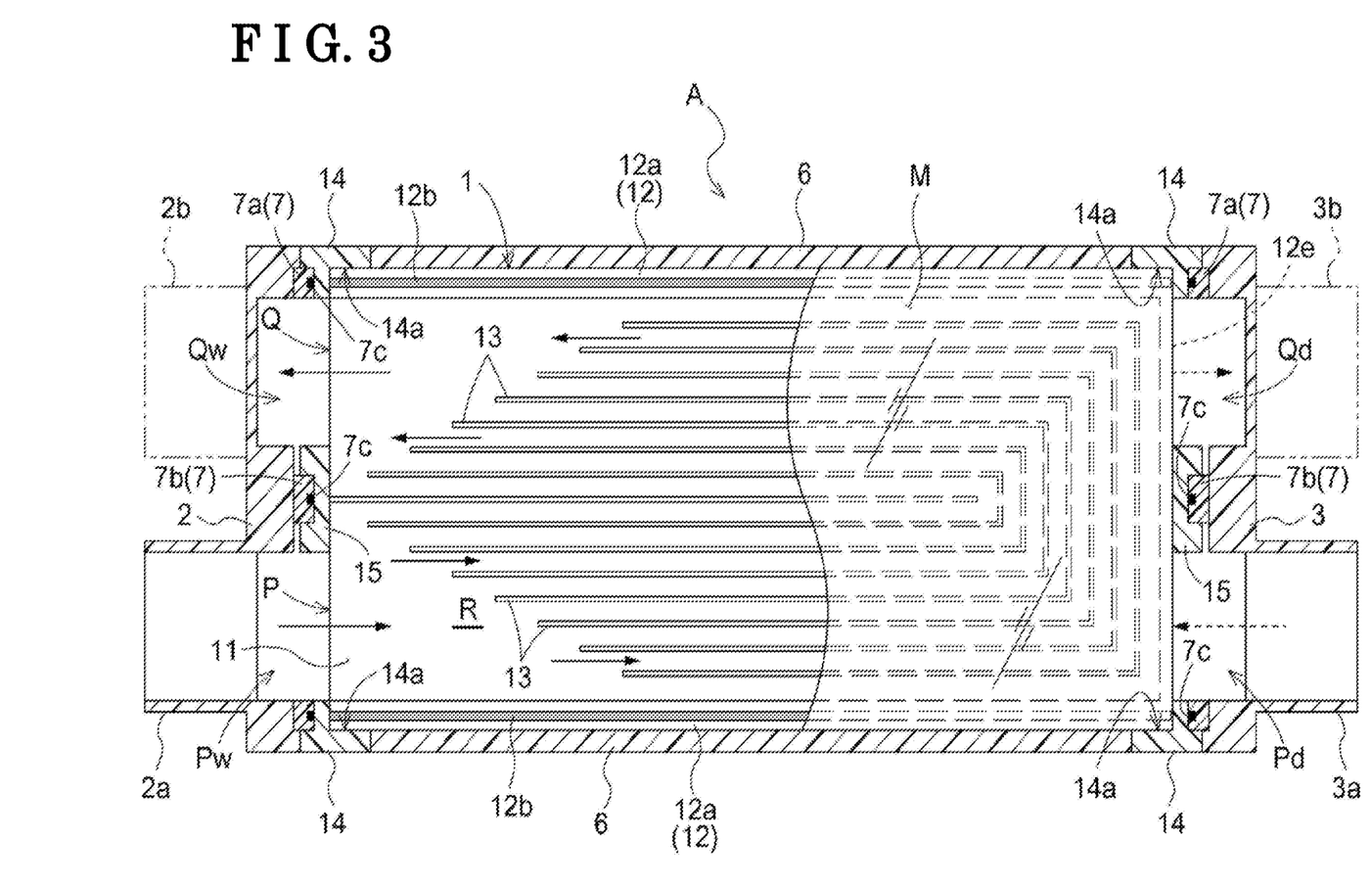
FIG. 3 is a transverse plain view of the humidifier.

The humidifier A shown in FIGS. 1 to 3 includes a top plate 4, a bottom plate 5, side plates 6, and the humidifier unit 1. The top plate 4 is arranged at an upper portion of the humidifier A. The bottom plate 5 is arranged at a bottom portion of the humidifier A. The side plates 6 are arranged at opposing portions of the humidifier A. The humidifier unit 1 is arranged at a position surrounded by the top plate 4, the bottom plate 5 and the side plates 6. The humidifier A includes the humidifying-side manifold 2 at first end portions of the top plate 4, the bottom plate 5, and the side plates 6, and the moisture-absorption-side manifold 3 at second end portions of the top plate 4, the bottom plate 5, and the side plates 6.

The humidifying-side manifold 2, the moisture-absorption-side manifold 3, the top plate 4, the bottom plate 5 and the pair of side plates 6 of the humidifier A are, for example, made of resin and manufactured by molding method.

As shown in FIGS. 2 and 3, seal bodies 7 are arranged at two positions which are between the humidifier unit 1 and the humidifying-side manifold 2, and between the humidifier unit 1 and the moisture-absorption-side manifold 3. The seal bodies 7 include, as shown in FIG. 2, outer frames 7a and partition frames 7b being made of resin. The outer frames 7a are generally formed in a quadrilateral shape, and the partition frames 7b each divides an inner space of the outer frame 7a into two parts. Seal members 7c made of resin or rubber are fitted into surfaces of the periphery of the outer frames 7a and the partition frames 7b, the surfaces facing the humidifier unit 1. Alternatively, a flexible resin material or rubber material may be used instead of the seal members 7c.

As shown in FIGS. 1 to 3, the humidifying-side manifold 2 includes a humidifying-side supply pipe 2a and a humidifying-side discharge pipe 2b. As shown in FIG. 3, the humidifying-side manifold 2 includes a dedicated, gas supply-and-discharge structure which supplies the cathode-off gas from the humidifying-side supply pipe 2a to a humidifying-side supply area Pw of the humidifier unit 1, and discharges the cathode-off gas from a humidifying-side discharging area Qw via the humidifying-side discharge pipe 2b to outside of the humidifier A.

Similarly, the moisture-absorption-side manifold 3 includes a moisture-absorption-side supply pipe 3a and a moisture-absorption-side discharging pipe 3b. The moisture-absorption-side manifold 3 includes a dedicated, gas supply-and-discharge structure which supplies the cathode gas from the moisture-absorption-side supply pipe 3a to a moisture-absorption-side supply area Pd of the humidifier unit 1 shown in FIG. 3, sends the cathode gas humidified inside the humidifier unit 1 from a moisture-absorption-side discharging area Qd, and discharges the cathode gas outside of the humidifier A via the moisture-absorption-side discharging pipe 3b. The humidifying-side supply pipe 2a and the moisture-absorption-side supply pipe 3a (the humidifying-side supply area Pw and the moisture-absorption-side supply area Pd) are arranged at a first side relative to the partition frame 7b, and the humidifying-side discharge pipe 2b and the moisture-absorption-side discharging pipe 3b (the humidifying-side discharging area Qw and the moisture-absorption-side discharging area Qd) are arranged at a second side relative to the partition frame 7b. According to the configuration, the moisture included in the cathode-off gas may be efficiently supplied to the cathode gas.

The humidifier A is provided in a fuel cell mounted on a fuel cell vehicle or a FCV, and supplied with the cathode-off gas (humidified gas) discharged from the fuel cell, and the cathode gas (dry gas) before being supplied to the fuel cell. As such, the humidifier A humidifies the cathode gas by supplying a part of moisture included in the cathode-off gas to the cathode gas (dry gas), the part of the moisture being penetrated through a water exchanging film M.

Figure 4:
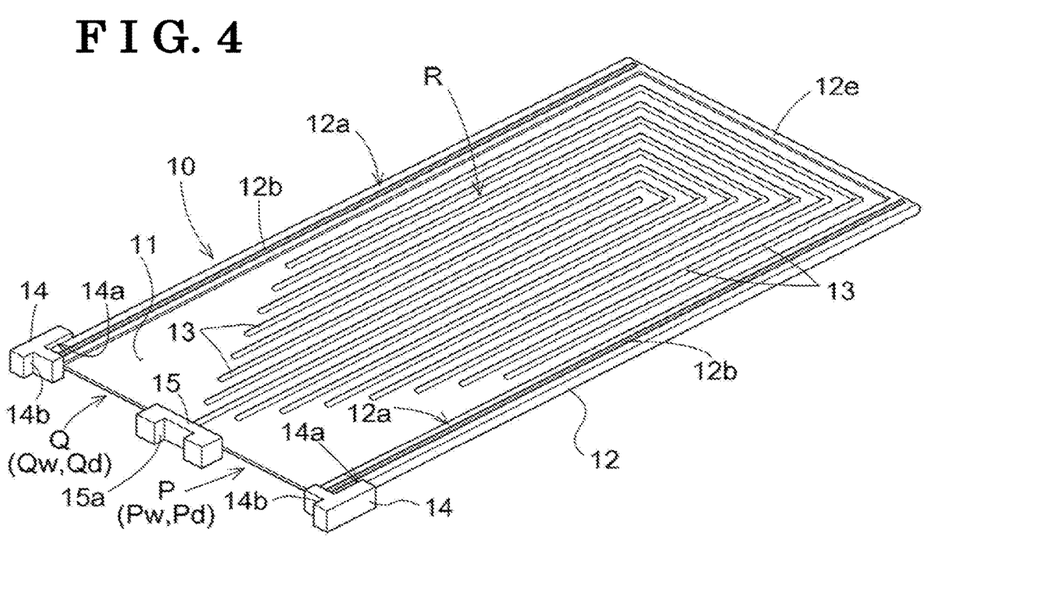
FIG. 4 is a perspective view of a separator.
Figure 6:
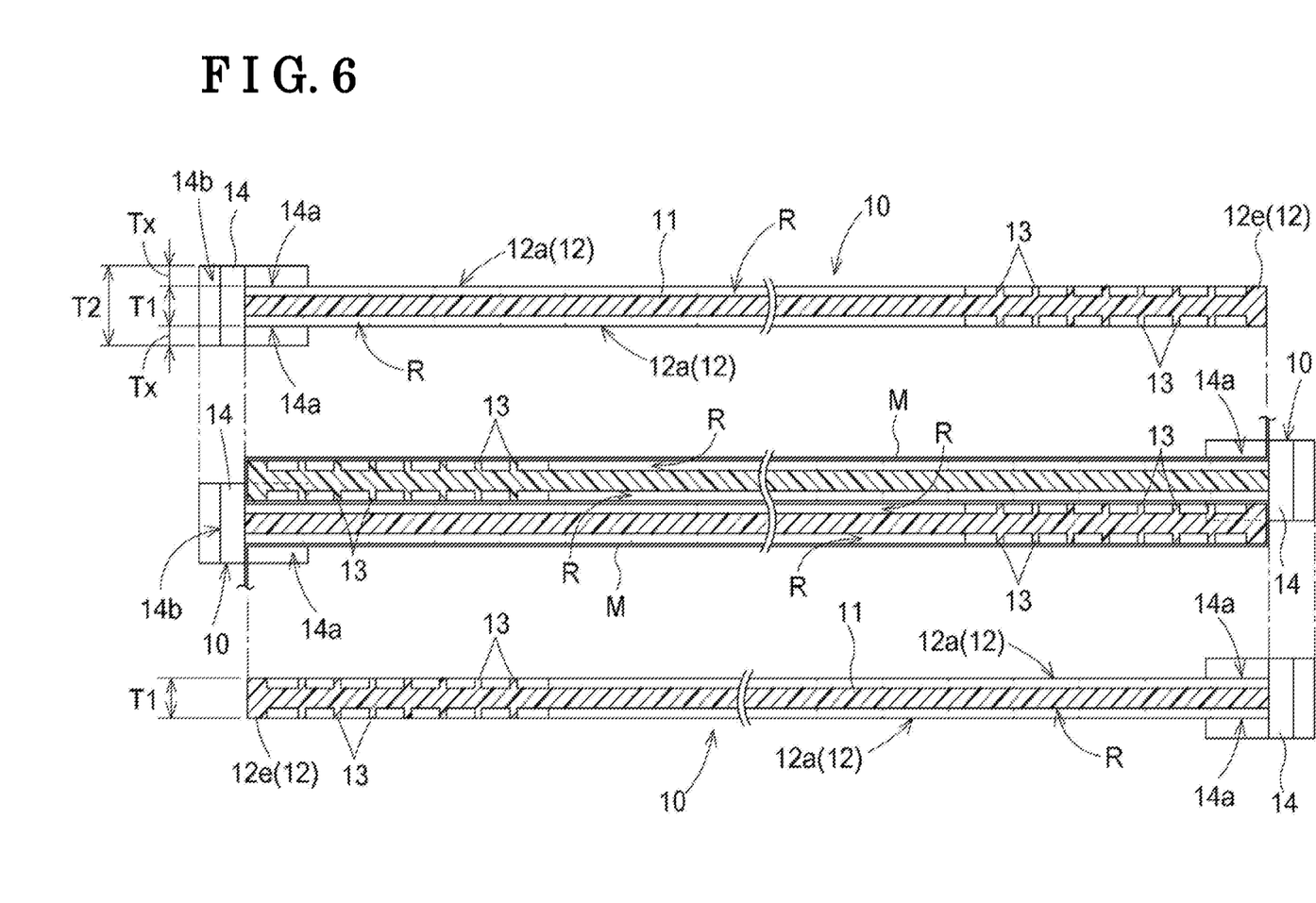
FIG. 6 is a cross-sectional view of the separator and the water exchanging film.
Figure 7:
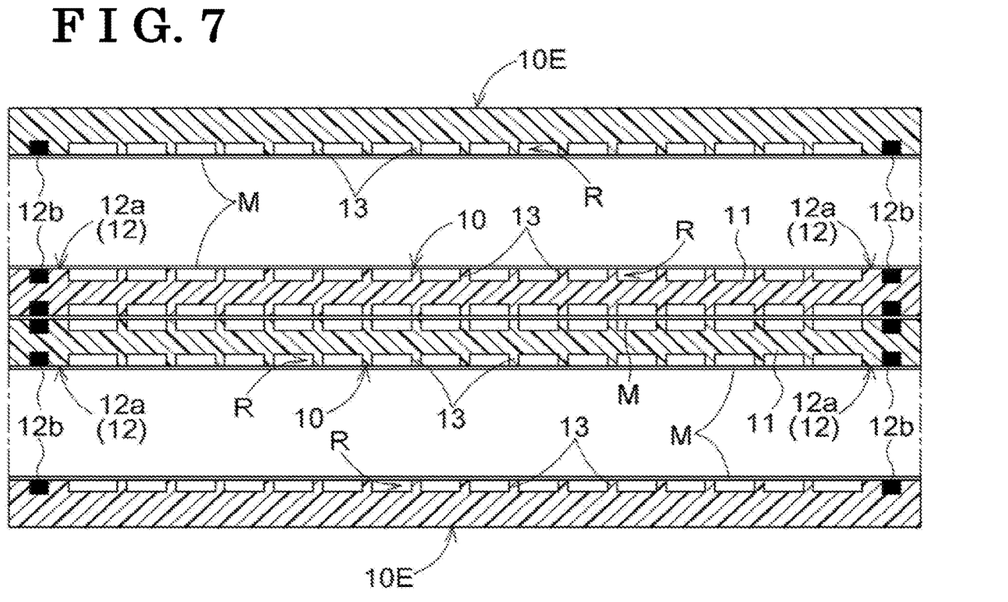
FIG. 7 is another cross-sectional view of the separator and the water exchanging film.

The humidifier unit 1 includes plural separators 10 each formed in a quadrilateral plate shape and stacked on each other or overlapped with each other. The water exchanging film M is sandwiched at a boundary of the separators 10 adjacent to each other in the upper-lower direction when the separators 10 are stacked on each other. Specifically, as shown in FIGS. 3 and 4, flow passages R, formed in a U shape, are provided at opposing surfaces which are a front side and a back side of the separator 10. As illustrated in FIGS. 6 and 7, the flow passages R provided at the front side and the back side of the separator 10 are formed so as to include the same shape, and arranged so as to include openings which are open in the same direction. Defining blocks 14 and a partition block 15 are provided at the opening side of the U-shaped flow path R of the separator 10. As illustrated in FIGS. 6 and 7, the separator 10 and the water exchanging film M are alternately stacked on each other such that the water exchanging film M is sandwiched at the boundary of the flow passages R, R of the separators 10, 10 which are arranged adjacent to each other. The flow passages R generally refer to plural areas where gas flows while being guided by plural guide walls 13.

As shown in FIG. 2, the humidifier unit 1 includes end separators 10E arranged at a position being stacked on the top separator 10 of the plural separators 10 stacked on each other, and at a position being stacked on the bottom separator 10 of the plural separators 10 stacked on each other. The end separators 10E each is provided with the flow path R only at one side or surface. As shown in FIG. 7, the flow path R of the end separator 10E and the flow path R of the separator 10 being adjacent thereto include the water exchanging film M at the boundary thereof.

Figure 5:
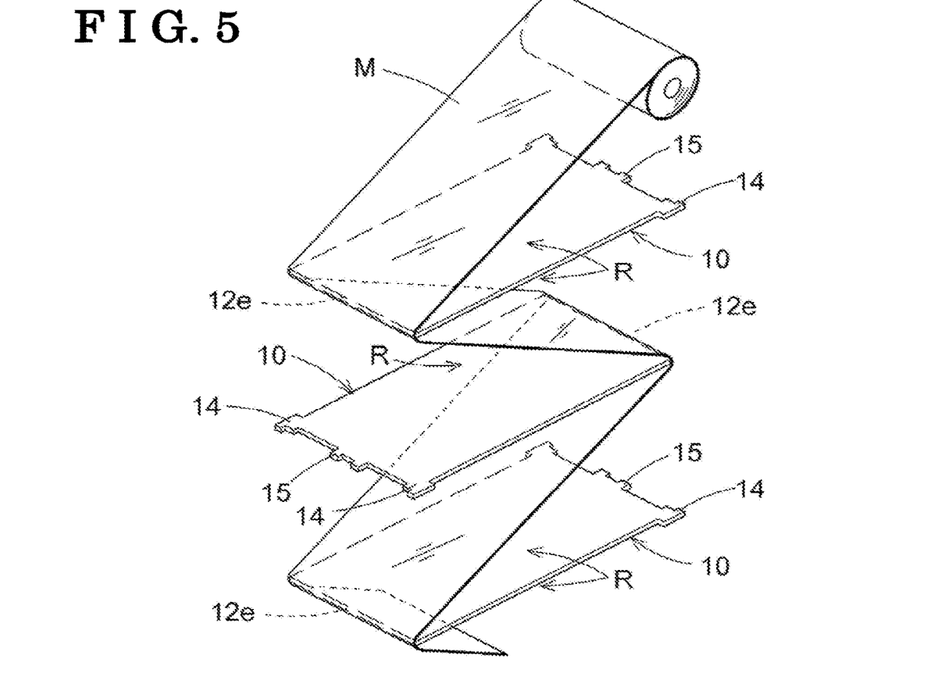
FIG. 5 is a perspective view of the separator and a water exchanging film.

The separator 10 and the end separators 10E of the humidifier unit 1 are made of resin and manufactured by molding method. The water exchanging film M is formed of one elongated sheet, and, as illustrated in FIGS. 2 and 5, is folded so as to be sandwiched at all the boundaries of the flow passages R which are adjacent to each other on the separators 10 arranged continuously in a stacking direction. That is, different parts of the elongated water exchanging film M are sandwiched at the plural boundaries continuously provided in the stacking direction of the plural separators 10 which are in the overlapped state.

As described above, the plural separators 10 are formed in the same shape, and the top side and the back side of the separator 10 shown in FIGS. 3 and 4 is formed in the same shape. According to the embodiment, as shown in FIG. 5, the plural separators 10 are stacked on each other such that the U-shaped openings (the definition blocks 14 and the partition block 15) are arranged so as to open alternately in the opposite direction.

As shown in FIGS. 3, 4, and 7, the separator 10 is formed in a quadrilateral shape including a pair of long sides and a pair of short sides when seen in a plan view. The separator 10 includes a base plate 11, an outer peripheral wall 12, and plural guide walls 13. The base plate 11 is formed in a thin plate shape. The outer peripheral wall 12 is formed thicker than the base plate 11 and extends from the front side to the back side of the base plate 11 along three outer rims excluding a short side of the four outer rims of the base plate 11. The plural guide walls 13 are provided on opposing surfaces of the base plate 11 at an area surrounded by the outer peripheral wall 12. Specifically, as shown in FIG. 4, an area where the outer peripheral wall 12 is not provided is referred to as an open area, and the opposite area of the open area of the outer peripheral wall 12 is referred to as outer peripheral end wall 12e. The guide walls 13 are formed so as to be symmetric relative to a center of the base plate 11 in the thickness direction of the base plate 11.

As shown in FIGS. 3 and 4, the plural guide walls 13 form the flow passages R and the gas flowing in the flow passages R comes in contact with the water exchanging film M. The plural guide walls 13 each is formed in a curve shape so as to send the gas supplied from a supply portion P linearly along the longitudinal direction of the base plate 11, send the gas along outer peripheral end wall 12e of the base plate 11 adjacent to the outer peripheral end wall 12e, and send the gas to a discharging portion Q linearly along the longitudinal direction of the base plate 11.

As shown in FIGS. 3 and 4, the separator 10 includes the definition blocks 14 at opposing ends of the separator 10 in the width direction of the open area (the lateral direction), and the partition block 15 at a center position in the width direction of the open area. In this configuration, a first area relative to the partition block 15 in the open area includes the supply portion P, and a second area relative to the partition block 15 in the open area includes the discharging portion Q.

The separator 10 is formed such that opposing areas relative to a center of the separator 10 in the width direction (the lateral direction) are formed symmetrically so that the supply portion P and the discharging portion Q are structurally the same. Thus, in a case where the open area of the separator 10 is arranged so as to face the humidifying-side manifold 2, the area being communicated with the humidifying-side supply area Pw corresponds to the supply portion P, and the area being communicated with the humidifying-side discharging area Qw corresponds to the discharging portion Q. Similarly, in a case where the open area of the separator 10 is arranged so as to face the moisture-absorption-side manifold 3, the area being communicated with the moisture-absorption-side supply area Pd corresponds to the supply portion P, and the area being communicated with the moisture-absorption-side discharging area Qd corresponds to the discharging portion Q.

As described above, the guide wall 13 is formed so as to be symmetric relative to a center of the base plate 11 in the thickness direction, and the same types of gas of the cathode-off gas and the cathode gas flows in the flow path R of the front side of the separator 10 and the flow path R of the back side of the separator 10. Thus, the separator 10 in which the cathode-off gas is supplied and discharged from the humidifying-side manifold 2 is referred to as the humidifier-side separator 10, and the separator in which the cathode gas is supplied from the moisture-absorption-side manifold 3 is referred to as the moisture-absorption-side separator 10. In this case, the flow path R of the humidifier-side separator 10 and the flow path R of the moisture-absorption-side separator 10 may be formed in the same shape or in the different shapes.

As shown in FIG. 4, the pair of areas of the outer peripheral wall 12 along the longitudinal direction each is embedded with a line seal 12b (an example of a sealant) made of soft resin and rubber so as to protrude slightly from a contact surface 12a of the outer peripheral wall 12. The line seal 12b prevents the gas flowing in the flow path R from leaking outside of the separator 10 in the width direction. Alternatively, glue (an example of the sealant) may be applied on the contact surface 12a of the outer peripheral wall 12 instead of the line seal 12b to attach the contact surface 12a to the water exchanging film M.

As shown in FIG. 6, the pair of defining blocks 14 and the partition block 15 protrude upwardly and downwardly by an offset amount Tx relative to the contact surfaces 12a of the front side and the back side of the outer peripheral wall 12. The protruding ends of the definition blocks 14 and the partition block 15 include flat surfaces respectively so as to be parallel to the contact surfaces 12a.

Specifically, as shown in FIG. 6, the offset amount Tx is set half of a first thickness T1 of the outer peripheral wall 12. That is, a second thickness T2 corresponding to the thickness of the defining block 14 in the thickness direction of the separator 10 includes the thickness in which the first thickness T1 is added to the double amount of the offset amount Tx.

As shown in FIGS. 3, 4, and 6, the pair of defining blocks 14 each includes a fitted wall portion 14b formed so as to be cut off a part of the parts protruding in the longitudinal direction of the separator 10. A fitted recessed portion 15a is provided at a part of the partition block 15 protruding in the longitudinal direction of the separator 10. As shown in FIG. 3, the pair of fitted wall portions 14b and the 15a prevent gas from leaking out while defining the position of the seal body 7 by being fitted by the outer frame 7a and the partition frame 7b of the seal body 7.

Engagement portions 14a into which parts close to the outer peripheral end wall 12e of the outer peripheral wall 12 of the separators 10 which are adjacent to each other are fitted are provided at inner surfaces of the pair of defining blocks 14, the inner surfaces standingly provided from the front side and the back side of the base plate 11. The outer peripheral walls 12 of the separators 10 adjacent to each other in the upper-lower direction each is fitted into the pair of engagement portions 14a, and accordingly, the outer peripheral walls 12 of the separators 10 adjacent to each other as shown in FIGS. 3 and 6 are retained in an overlapped state with each other in a positioned state.

As described above, the thickness of the outer peripheral wall 12 is set as the first thickness T1, the thickness of the definition blocks 14 is set as the second thickness T2, and the offset amounts Tx are specified. Accordingly, in a case where the plural separators 10 are stacked on each other, the outer peripheral walls 12 of the separators 10 adjacent to each other are closely in contact with each other, the pair of defining blocks 14, 14 of the separators 10 adjacent to each other are closely in contact with each other, and the partition blocks 15, 15 of the separators 10 adjacent to each other are closely in contact with each other, at the position where the separators 10 sandwich the water exchanging film M therebetween.

As shown in FIGS. 6 and 7, the separator 10 includes the base plate 11 at a half position of the second thickness T2 of the outer peripheral wall 12 in the thickness direction, and the contact surface 12a are provided at the opposing surfaces of the outer peripheral wall 12 in the thickness direction. As described above, the plural guide walls 13 are provided at the opposing surfaces of the base plate 11, and the dimensional relationship is set such that the protruding height of the plural guide walls 13 from the base plate 11 and the protruding height of the contact surface 12a are equal to each other. Accordingly, an imaginary plane connecting the contact surface 12a and the protruding ends of the plural guide walls 13 corresponds to a border between the flow path R and the water exchanging film M (hereinafter simply referred to as a border of the flow path R).

The end separator 10E includes the configuration in which the outer peripheral wall 12, the plural guide walls 13, the defining blocks 14, and the partition block 15 that protrude at one of the opposing surfaces of the base plate 11.

The summary of the assembling method of the humidifier A will be explained when the upper lower direction and the width direction thereof are in accordance with these thereof oriented as shown in FIG. 1. When assembling the humidifier A, the water exchanging film M is pulled out from a roll of the elongated water exchanging film M shown in FIG. 5 and is sandwiched by the separators 10 adjacent to each other, or by the separator 10 and the end separator 10E adjacent to each other as shown in FIG. 2.

The water exchanging film M is oriented so as to be along the separator 10 in the longitudinal direction, and is folded at the outward of the outer peripheral end wall 12e serving as an end portion of the separator 10 in the longitudinal direction while being sandwiched at the boundary of the flow passages R of the separators 10 adjacent to each other. Accordingly, the following area of the water exchanging film M is sandwiched at the next boundary. The water exchanging film M is closely in contact with the outer surface of the outer peripheral end wall 12e of the separator 10 so as to act the tensile force to the water exchanging film M.

The specific process includes pulling the water exchanging film M out from the roll, setting the distal end of the water exchanging film M to the back side of the end separator E which is arranged at the bottom of the separators 10, mounting the water exchanging film M on the boundary of the flow path R of the end separator E of the bottom end of the separators 10 by folding the water exchanging film M, and stacking on the separator 10 adjacent to the end separator 10E thereon.

Next, the process includes arranging the water exchanging film M on the separator 10 so as to cover the flow path R of the front side of the separator 10 stacked on the surface of the end separator 10E, and stacking on another separator 10 which is adjacent to the said separator 10 on the front side thereof. Specifically, as shown in FIGS. 3 and 6, in a case where the separators 10 are stacked on each other, the orientation of the separators 10 is set so as to include the open area of the upper separator 10 at the position where the open area is stacked on the outer peripheral end wall 12e of the lower separator 10. Accordingly, the humidifier-side separator 10 and the moisture-absorption-side separator 10 are stacked on each other so as to be adjacent to each other alternately in the upper-lower direction.

In a case where the plural separators 10 are stacked on each other, as shown in FIG. 3, the outer peripheral end wall 12e of the separator 10 engages with the engagement portions 14a of the definition blocks 14 of the lower separator 10 so that the outer peripheral end walls 12e and the engagement portions 14a are in the positioned state, and the separators 10 are highly precisely overlapped with each other in the width direction. As such, the humidifier unit 1 is assembled such that the plural separators 10 are stacked on each other, the end separator 10E is overlapped on the front side of the top separator 10, and a distal end of the water exchanging film M is overlapped on the front side of the end separator 10E.

As shown in FIGS. 6 and 7, the humidifier unit 1 assembled as above prevents gas from leaking out at a part where the line seal 12b is provided, the line seals 12b provided at the contact surfaces 12a of the outer peripheral walls 12 of the plural separators 10, the line seals 12b sandwiching the water exchanging film M therebetween. Further, the humidifier unit 1 prevents gas from leaking out from clearances of the definition blocks 14 and the partition block 15 which are overlapped with each other because the definition blocks 14 and the partition block 15 are closely in contact with each other while being overlapped with each other.

As described above, the top plate 4 is arranged at the upper portion of the humidifier unit 1, the bottom plate 5 is arranged at the bottom portion of the humidifier unit 1, the side plates 6 are arranged at opposing sides of the humidifier unit 1, the seal bodies 7 are arranged at opposing end positions in the longitudinal direction of the humidifier unit 1, the humidifying-side manifold 2 and the moisture-absorption-side manifold 3 are provided, and the humidifier A is provided by fixing the top plate 4, the bottom plate 5, the side plates 6, the seal bodies 7, the humidifying-side manifold 2 and the moisture-absorption-side manifold 3.

According to the aforementioned embodiment, following effects and advantages may be attained.

The humidifier unit 1 may be easily assembled, comparing to a unit including a water exchanging film which is cut in a sheet shape, by stacking on the plural separators 10 so as to sandwich the different areas of the water exchanging film M without cutting the water exchanging film M rolled out from the roll, and by including the end separators 10E on the top and bottom of the separators 10. The gas may not be prevented from being supplied and discharged by the water exchanging film M by positioning the elongated water exchanging film M at the next boundary after being folded at the outward of the outer peripheral end wall 12e of the separator 10 when the water exchanging film M is sandwiched by the plural separators 10.

In this configuration, appropriate tensile force may be applied to the water exchanging film M. Accordingly, the process may be simplified and the time consumed for assembling the humidifier A may be reduced without wasting the water exchanging film M.

Specifically, the separators 10 of the humidifier A are formed in the same shape, and the separator 10 includes the pair of defining blocks 14. Accordingly, the orientation of the plural separators 10 in the overlapped state may be appropriately maintained. Further, as the pair of defining clocks 14 and the partition block 15 are arranged at a first end portion of the separator 10 in the longitudinal direction thereof, the supply portion P and the Q may be arranged in parallel arrangement.

The water exchanging film M is in contact with the line seals 12b arranged at opposing ends of the outer peripheral wall 12 of the separator 10 in the width direction in a state where the plural separators 10 are stacked on each other, and accordingly, gas is prevented from leaking out by blocking the flow of the gas in the width direction of the water exchanging film M.

The cathode-off gas supplied to the humidifying-side supply pipe 2a of the humidifying-side manifold 2 flows in the flow path R of the plural humidified-side separators 10, and the cathode gas supplied to the moisture-absorption-side supply pipe 3a of the moisture-absorption-side manifold 3 flows in the flow path R of the plural moisture-absorption-side separators 10. Accordingly, the moisture and the heat of the cathode-off gas flown in the flow path R of the humidified-side separators 10 are applied to the cathode gas flown in the flow path R of the moisture-absorption-side separators 10 via the water exchanging film M, and the moisturization and the temperature increase of the cathode gas may be achieved.

The cathode-off gas flown in the flow path R of the humidified-side separator 10 may be discharged from the humidifying-side discharge pipe 2b, and the cathode gas flown to the moisture-absorption-side separator 10, humidified, and heated to raise the temperature thereof may be discharged from the moisture-absorption-side discharging pipe 3b.

The aforementioned disclosure may also be configured as below other than the aforementioned embodiment. For convenience of description, the same components as those described in the first embodiment are marked with the same reference numerals.

Figure 8:
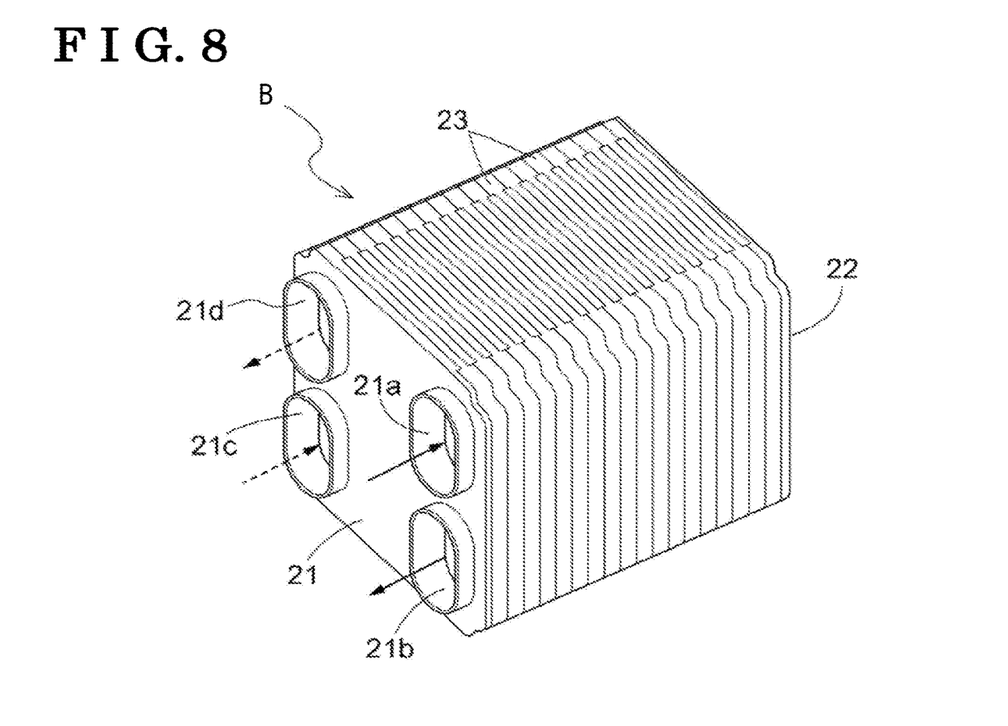
FIG. 8 is a perspective view of a humidifier according to a second embodiment.
Figure 9:
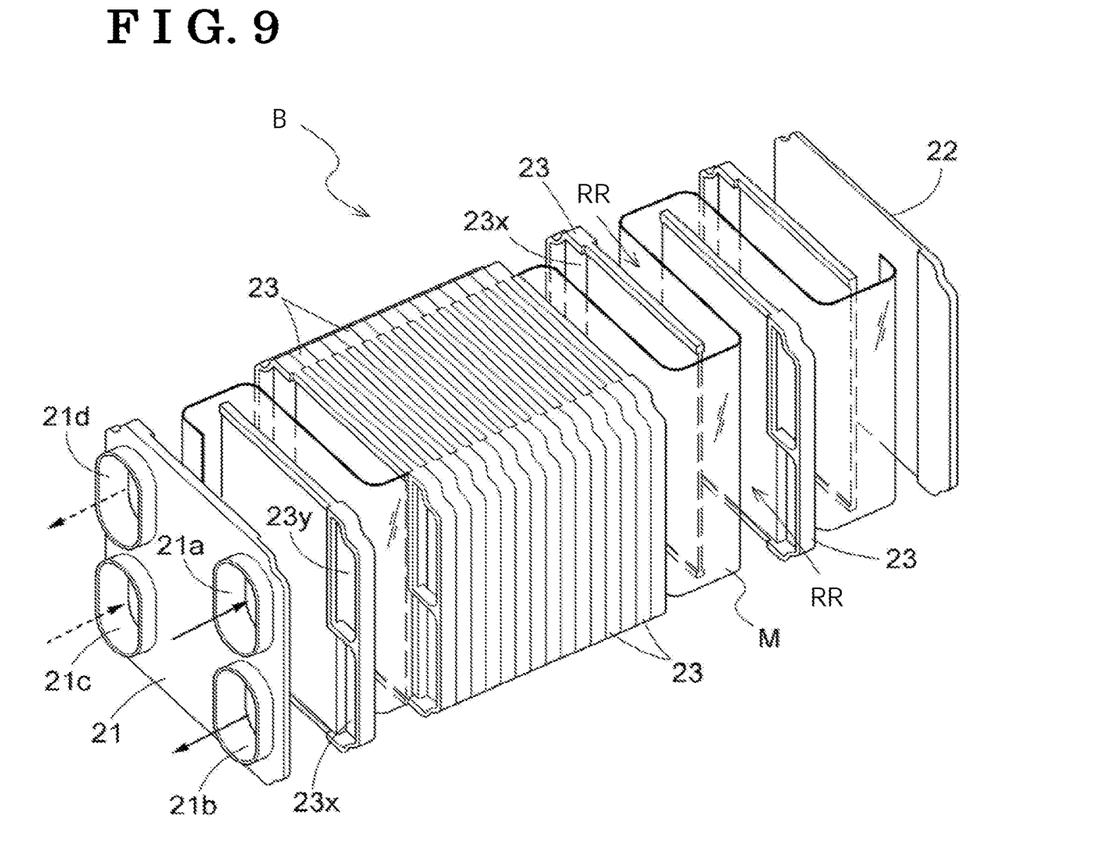
FIG. 9 is an exploded perspective view of the humidifier of the second embodiment.

As illustrated in FIGS. 8 and 9, a humidifier B is configured such that plural separators 23 are arranged between a supply and discharge plate 21 and an end plate 22, and the plural separators 23 are stacked on each other to sandwich the water exchanging film M therebetween. As in the first embodiment, the one-sheet, elongated water exchanging film M wound up to be formed in a roll shape is sandwiched at the boundary of the separators 23 of the humidifier B (specifically, the boundary of the flow passages R of the separators 23 adjacent to each other).

Figure 10:
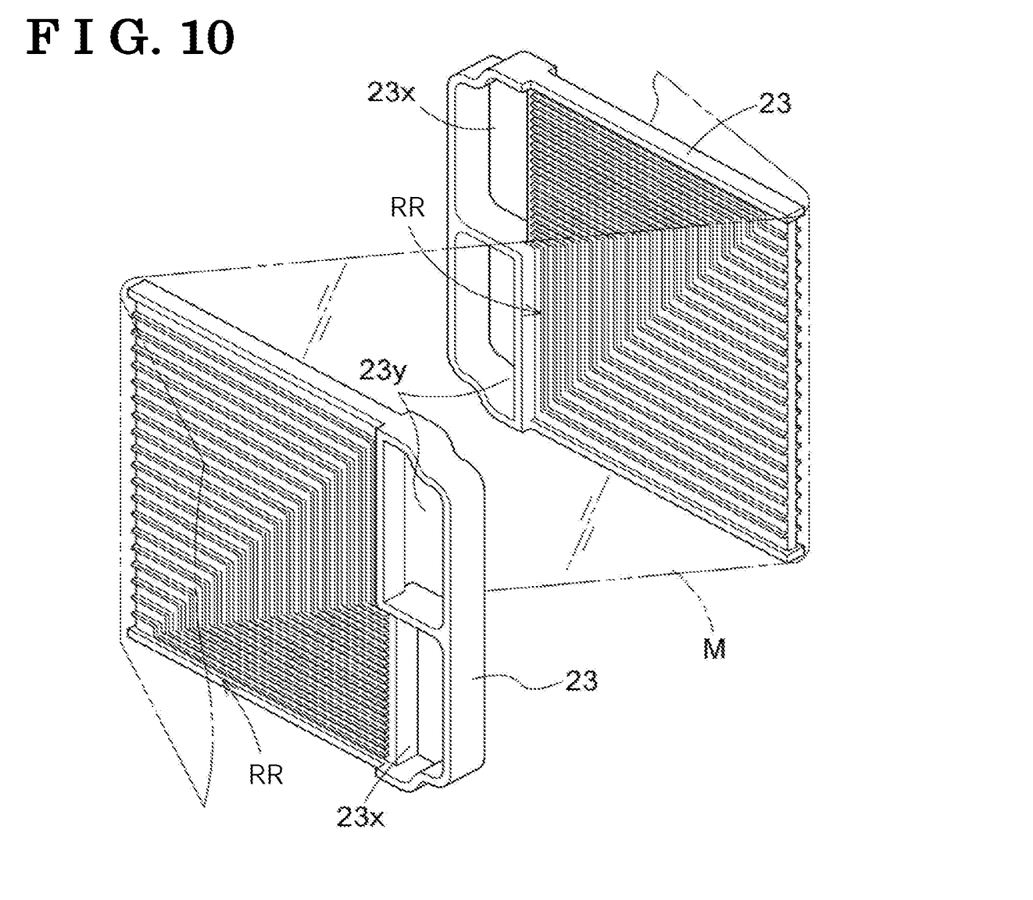
FIG. 10 is a perspective view of a separator and a water exchanging film of the second embodiment.

According to the second embodiment, as shown in FIGS. 9 and 10, the supply and discharge plate 21 includes a humidified-side supply port 21a, a humidified-side discharge port 21b, a moisture-absorption-side supply port 21c, and a moisture-absorption-side discharge port 21d. The plural separators 23 each is formed in a square plate shape, and a first communication port 23x and a second communication port 23y are formed in a through-hole shape orthogonal in a surface direction at a first end portion of the separator 23. A second end portion of the separator 23 which is arranged opposite to the side where the first communication port 23x and the second communication port 23y are formed is referred to as an outer end portion of the separator 23.

A separator of the separators 23 of the humidifier B of the second embodiment to which the cathode-off gas is supplied or from which the cathode-off gas is discharged is referred to as a humidified-side separator 23, and a moisture-absorption-side separator 23, respectively.

Figure 11:
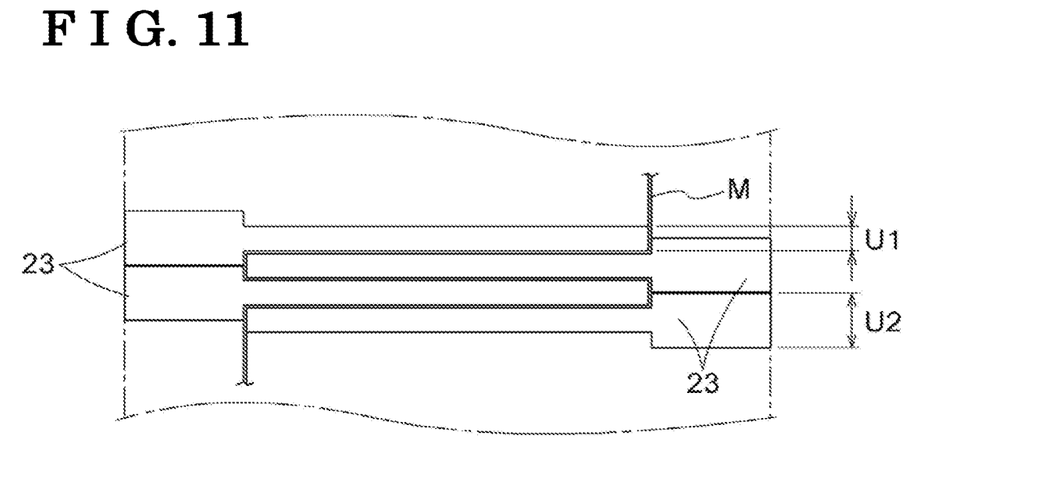
FIG. 11 is a view of a part where the separators are stacked on each other.

A flow path RR including plural grooves being communicated with the first communication port 23x is provided at a first side of the separator 23, and the flow path RR including the plural grooves being communicated with the second communication port 23y is provided at a second side of the separator 23, and the flow path RR is communicated with each other at an outer rim portion of the separator 23. As shown in FIG. 11, based on a thickness U1 of a flow path of an area where the flow path RR is provided, a thickness U2 of a communication portion of an area where the first communication port 23x and the second communication port 23y are provided is set twice the thickness U1 of the flow path of the area where the flow path RR is provided. In a state of being stacked on each other, the separators 23 are configured such that clearances are not generated between flow path portions and communication portions.

The flow path RR including the plural grooves being communicated with the first communication port 23x is provided so as to send gas to all the width of the separator 23. Similarly, the flow path RR including the plural grooves being communicated with the second communication port 23y is provided so as to send gas to all the width of the separator 23.

The humidifier B of the second embodiment is configured such that the separators 23 including the same structure are set so as to be oriented by rotating by 180 degrees when seen in a direction orthogonal to a plate surface, and sandwich the water exchanging film M therebetween. Accordingly, the second communication port 23y and the first communication port 23x of the separator 23 are communicated with the humidified-side supply port 21a and the humidified-side discharge port 21b of the supply and discharge plate 21 respectively, and the first communication port 23x and the second communication port 23y of the separator 23 are communicated with the moisture-absorption-side supply port 21c and the moisture-absorption-side discharge port 21d of the supply and discharge plate 21 respectively.

The humidifier B of the second embodiment is configured such that the plural separators 23 and the water exchanging film M are alternately arranged when being assembled. The water exchanging film M is sandwiched at the next boundary by being folded at the outer end of the separator 23. Accordingly, the cathode-off gas is supplied from the humidified-side supply port 21a of the supply and discharge plate 21, sent to the flow path R of the front side of the separator 23 from the second communication port 23y of the plural humidified-side separators 23, and discharged from the humidified-side discharge port 21b of the supply and discharge plate 21 via the first communication port 23x by flowing from the outer end to the flow path R of the back side of the separator 23.

Similarly, the cathode gas is supplied from the moisture-absorption-side supply port 21c of the supply and discharge plate 21, sent from the second communication port 23y of the plural moisture-absorption-side separators 23 to the flow path RR of the front side of the separator 23, and is discharged from the moisture-absorption-side discharge port 21d via the first communication port 23x by flowing from the outer rim to the flow path RR of the back side of the separator 23.

The cathode-off gas flows in the flow path RR of the front and back sides of the separator 23, and the cathode gas flows in the flow path RR of the moisture-absorption-side separator 23. Accordingly, the cathode gas may be humidified by being supplied with moisture of the cathode-off gas such that the moisture of the cathode-off gas penetrates the water exchanging film M, and at the same time, the temperature of the cathode gas may be increased such that the heat of the cathode-off gas is conducted to the cathode gas.

As such, according to the humidifier B of the second embodiment, the film material of the water exchanging film M is pulled from the roll which is wound with the elongated water exchanging film M, and is sandwiched at the boundary of the flow path RR of the separators 23 adjacent to each other. Accordingly, the process may be simplified and the time consuming for the assembling may be reduced.

According to the aforementioned second embodiment, the first communication port 23x and the second communication port 23y of the separator 23 provided at the front side and the back side of the separator 23 are communicated with each other via the flow path RR. Alternatively, similarly to the separator 10 of the first embodiment, the first communication port 23x and the second communication port 23y are communicated with each other via the flow path RR provided at one side (one surface) of the separator 23, and the first communication port 23x and the second communication port 23y may be communicated with each other via the flow path RR provided at the other side (the other surface) of the separator 23.

In the second embodiment, a line seal or the like may be provided at a part of the separator 23 where the water exchanging film M is sandwiched. The gas may be prevented from leaking by the seal.

The configuration in which the elongated water exchanging film M is sandwiched at the boundary of the flow path R (the flow path RR) of the separator 10 in the first embodiment (the separator 23 in the second embodiment) may not be limited to the humidifier A of the first embodiment and the humidifier B of the second embodiment. The configuration may be applied to another humidifier including a configuration which is different from the above-described configuration.

As the industrial applicability, the disclosure may be applied to a humidifier in which a water exchanging film is sandwiched at a boundary of a flow path provided at plural separators.

According to the aforementioned first and second embodiments, the humidifier (A, B) includes the plural separators (10, 23) each formed in a plate shape, the separator (10, 23) including the flow path (R, RR) on each of the front side and the back side thereof, and the water exchanging film (M) sandwiched between the separators (10, 23) at the boundary thereof which are adjacent to each other in a state where the plural separators (10, 23) are stacked on each other. In a stacked state where each of the plural separators (10, 23) and the water exchanging film (M) are alternately stacked on each other, humidified gas flows in one of the flow paths (R, RR) facing each other with the water exchanging film (M) therebetween, and dry gas flows in the other of the flow paths (R, RR). The water exchanging film (M) is formed in an elongated shape, and the different areas of the water exchanging film (M) are sandwiched by the separators (10, 23) at the plural boundaries thereof, respectively, the boundaries continuously provided in the stacking direction of the separators (10, 23) in the stacked state.

According to the aforementioned configuration, the plural separators (10, 23) sandwich the water exchanging film M therebetween at the boundaries thereof to supply the humidified gas to the flow path (R, RR) arranged at the first side of the water exchanging film M and supply the moisture of the humidified gas to the dry gas via the water exchanging film M by supplying the dry gas to the flow path (R, RR) arranged at the second side of the water exchanging film M. Specifically, in this configuration, the water exchanging film M is formed in an elongated shape, and a predetermined area of the elongated water exchanging film M is sandwiched at one of the plural boundaries continuously provided in the stacking direction of the separator (10, 23), and the other area of the water exchanging film M is sandwiched at the boundary which is continuously provided from the one of the plural boundaries. As such, because the one-sheet water exchanging film M is sandwiched at the plural border areas continuously provided, for example, the process for cutting the water exchanging film M and the process for highly-precisely arranging the cut, sheet-shaped water exchanging film M may not be required. Thus, the humidifier (A, B) may be easily manufactured with the configuration in which the water permeable film is sandwiched between the separators (10, 23) which are stacked on each other.

According to the aforementioned first and second embodiments, the different areas of the water exchanging film (M) in the longitudinal direction thereof are sandwiched by the separators (10, 23) at the plural boundaries thereof, respectively, the boundaries continuously provided in the stacking direction of the separators (10, 23) in a state where the water exchanging film (M) is folded at the outside of the separators (10, 23).

According to the aforementioned configuration, the water exchanging film M is folded at the outside of the separator (10, 23) so that the different area of the elongated water exchanging film M in the longitudinal direction may be sandwiched at the plural boundaries continuously provided in the stacking direction. The process for sandwiching the water exchanging film M at the border line may be simplified, and the water exchanging film M may not be wasted.

According to the aforementioned first embodiment, the humidifier (A, B) further includes the sealant (the line seal 12b) sealing between the end rim of the water exchanging film (M) in the width direction thereof, the width direction orthogonal to the longitudinal direction, and the outer peripheral portion of the separator (10, 23), the outer peripheral portion facing the end rim of the water exchanging film (M).

Accordingly, because the humidifier (A, B) includes the sealant (the line seal 12b) for sealing the end rim of the elongated water exchanging film M in the width direction thereof, the gas may be prevented from leaking in the width direction of the water exchanging film M. For example, comparing to the humidifier (A, B) in which the sealant is arranged at a predetermined position of the outer periphery of the cut, sheet-shaped water exchanging film M, the seal may be simply formed, and the operation for applying the seal may be simplified.

According to the aforementioned first embodiment, the separator (10) is formed in a quadrilateral shape, the separator (10) including the four outer rims, three thereof formed with the outer peripheral wall (12) from the front side to the back side of the separator (10), the separator (10) including the open area at the outer rim thereof, the outer rim where the outer peripheral wall (12) is not formed, the separator (10) including the supply portion (P) supplying gas from the outside of the separator (10) to the flow path (R) of the front side and the flow path (R) of the backside of the separator at the open area, the separator (10) including the discharge portion (Q) discharging the gas to the outside of the separator from the flow path (R) of the front side and the flow path of the back side of the open area provided in the separator (10). The supply portion (P) and the discharge portion (Q) are arranged in parallel to each other. The water exchanging film (M) is folded at the outside of the outer peripheral wall (12) opposite to the open area of the separator (10).

Accordingly, the outer peripheral wall from the front side to the back side of the quadrilateral separator (10) is formed at three of four outer rims thereof, and the one side where the outer peripheral wall is not formed includes the open area. The supply portion (P) and the discharge portion (Q) are arranged in parallel to each other at the open area, and the gas may be supplied to the flow path (R) from the supply portion (P) and the gas sent to the flow path (R) may be discharged outside the separator (10) from the discharge portion (Q). Because the water exchanging film M is folded at the outside of the outer peripheral wall which is arranged opposite to the open area of the separator (10), the water exchanging film M does not block the flow of the gas at the supply portion (P) and the discharge portion (Q).

According to the aforementioned first and second embodiments, the water exchanging film (M) sandwiched between the separators (10, 23) at all the boundaries thereof corresponds to an elongated, sheet-shaped water exchanging film.

Accordingly, the humidifier may be further easily manufactured because the area of the elongated, one-sheet water exchanging film M in the longitudinal direction is sandwiched by the plural boundaries of the separator (10, 23).

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A humidifier, comprising:
a plurality of separators each formed in a plate shape, the separator including a flow path on each of a front side and a back side thereof; and
a water exchanging film sandwiched between the separators at a boundary thereof which are adjacent to each other in a state where the plurality of separators are stacked on each other, wherein
in a stacked state where each of the plurality of separators and the water exchanging film are alternately stacked on each other, humidified gas flows in one of the flow paths facing each other with the water exchanging film therebetween, and dry gas flows in the other of the flow paths; and
the water exchanging film is formed in an elongated shape, and different areas of the water exchanging film are sandwiched by the separators at a plurality of boundaries thereof, respectively, the boundaries continuously provided in a stacking direction of the separators in the stacked state.

2. The humidifier according to claim 1, wherein the different areas of the water exchanging film in a longitudinal direction thereof are sandwiched by the separators at the plurality of boundaries thereof, respectively, the boundaries continuously provided in the stacking direction of the separators in a state where the water exchanging film is folded at an outside of the separators.

3. The humidifier according to claim 2, further comprising:
a sealant sealing between an end rim of the water exchanging film in a width direction thereof, the width direction orthogonal to the longitudinal direction, and an outer peripheral portion of the separator, the outer peripheral portion facing the end rim of the water exchanging film.

4. The humidifier according to claim 2, wherein
the separator is formed in a quadrilateral shape;
the separator includes four outer rims, three thereof formed with an outer peripheral wall from the front side to the back side of the separator;
the separator includes an open area at the outer rim thereof, the outer rim where the outer peripheral wall is not formed;
the separator includes a supply portion supplying gas from the outside of the separator to the flow path of the front side and the flow path of the backside of the open area provided in the separator;
the separator includes a discharge portion discharging the gas to the outside of the separator from the flow path of the front side and the flow path of the back side of the open area provided in the separator;
the supply portion and the discharge portion are arranged in parallel to each other; and
the water exchanging film is folded at an outside of the outer peripheral wall opposite to the open area of the separator.

5. The humidifier according to claim 1, wherein the water exchanging film sandwiched between the separators at all the boundaries thereof corresponds to an elongated, sheet-shaped water exchanging film.

* * * * *